(12) United States Patent
Cho

(10) Patent No.: US 12,315,401 B2
(45) Date of Patent: May 27, 2025

(54) DISPLAY APPARATUS, VIRTUAL REALITY DISPLAY SYSTEM INCLUDING THE SAME, AUGMENTED REALITY DISPLAY SYSTEM AND METHOD OF DRIVING THE SAME

(71) Applicant: Samsung Display Co., Ltd., Yongin-si (KR)

(72) Inventor: Seongheon Cho, Incheon (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/940,353

(22) Filed: Sep. 8, 2022

(65) Prior Publication Data

US 2023/0154365 A1  May 18, 2023

(30) Foreign Application Priority Data

Nov. 17, 2021  (KR) ........................ 10-2021-0158555

(51) Int. Cl.
*G09G 3/20* (2006.01)
*G06F 3/01* (2006.01)
*G09G 3/00* (2006.01)

(52) U.S. Cl.
CPC ............. *G09G 3/003* (2013.01); *G06F 3/013* (2013.01); *G09G 3/002* (2013.01);
(Continued)

(58) Field of Classification Search
CPC .. G09G 3/003; G09G 3/002; G09G 2320/045; G09G 2320/0686; G09G 2330/10; G09G 2354/00; G09G 3/00; G09G 3/20; G09G 3/30; G09G 3/32; G09G 3/36; G09G 3/3208; G09G 3/3258; G09G 3/3275; G09G 3/3266; G09G 5/10; G06F 3/013; G06F 1/16; G06F 3/01; G06T 1/60;
(Continued)

(56) References Cited

U.S. PATENT DOCUMENTS 6,366,263 B1 * 4/2002 Takasu .................. G09G 1/165
345/13
11,705,037 B1 * 7/2023 Hafiz ....................... G09G 3/20
345/204

(Continued)

FOREIGN PATENT DOCUMENTS

KR    1020140014694 A    2/2014
KR    1020180039224 A    4/2018
(Continued)

OTHER PUBLICATIONS

Extended European Search Report for Application No. 22208014.5-1210 dated Mar. 28, 2023.

*Primary Examiner* — Chanh D Nguyen
*Assistant Examiner* — Nguyen H Truong
(74) *Attorney, Agent, or Firm* — CANTOR COLBURN LLP

(57) ABSTRACT

A display apparatus includes a display panel, a driving controller and a data driver. The driving controller operates a stain compensation for a first compensation area of the display panel in a first frame and for a second compensation area of the display panel in a second frame to generate a data signal. The data driver converts the data signal into a data voltage and outputs the data voltage to the display panel.

11 Claims, 14 Drawing Sheets

(52) U.S. Cl.
CPC ............ *G09G 2320/045* (2013.01); *G09G 2320/0686* (2013.01); *G09G 2330/10* (2013.01); *G09G 2354/00* (2013.01)

(58) Field of Classification Search
CPC .... G06T 5/00; G06T 5/10; G06T 5/20; G06T 5/40; G06T 5/50; G06T 7/00; G06T 7/13; G06T 7/90; G06T 19/00; G09T 11/00; G06K 9/40; G06K 9/46; G06K 9/62
See application file for complete search history.

(56) References Cited

U.S. PATENT DOCUMENTS

| | | | |
|---|---|---|---|
| 2002/0118339 A1* | 8/2002 | Lowe | A61B 3/032 351/209 |
| 2007/0291227 A1 | 12/2007 | Yang et al. | |
| 2014/0028859 A1* | 1/2014 | Kim | G09G 3/30 348/189 |
| 2014/0320479 A1 | 10/2014 | Kaneko et al. | |
| 2017/0084228 A1* | 3/2017 | Kwak | G09G 3/20 |
| 2018/0103245 A1* | 4/2018 | Yoo | G02B 27/017 |
| 2019/0197935 A1* | 6/2019 | Kim | G09G 3/006 |
| 2019/0206315 A1 | 7/2019 | Park et al. | |
| 2020/0111405 A1* | 4/2020 | Kim | G09G 3/2007 |
| 2021/0035498 A1 | 2/2021 | Chang | |
| 2022/0415045 A1* | 12/2022 | Teng | G06F 9/4881 |

FOREIGN PATENT DOCUMENTS

| | | |
|---|---|---|
| KR | 1020190052195 A | 5/2019 |
| KR | 1020190081471 A | 7/2019 |
| KR | 1020200001658 A | 1/2020 |
| KR | 102075920 B1 | 2/2020 |
| KR | 1020200039891 A | 4/2020 |
| KR | 1020210035421 A | 4/2021 |

* cited by examiner

DISPLAY APPARATUS, VIRTUAL REALITY DISPLAY SYSTEM INCLUDING THE SAME, AUGMENTED REALITY DISPLAY SYSTEM AND METHOD OF DRIVING THE SAME

This application claims priority to Korean Patent Application No. 10-2021-0158555, filed on Nov. 17, 2021, and all the benefits accruing therefrom under 35 U.S.C. § 119, the content of which in its entirety is herein incorporated by reference.

BACKGROUND

1. Field

Embodiments of the invention relate to a display apparatus, a virtual reality display system including the display apparatus, an augmented reality display system including the display apparatus and a method of driving the display apparatus. More particularly, embodiments of the invention relate to a display apparatus reducing a power consumption by reducing memory access when compensating a stain of an image, a virtual reality display system including the display apparatus, an augmented reality display system including the display apparatus and a method of driving the display apparatus.

2. Description of the Related Art

A display apparatus includes a display panel and a display panel driver. The display panel includes a plurality of gate lines, a plurality of data lines and a plurality of pixels. The display panel driver includes a gate driver, a data driver and a driving controller. The gate driver outputs gate signals to the gate lines. The data driver outputs data voltages to the data lines. The driving controller controls driving timings of the gate driver and the data driver.

SUMMARY

A luminance deviation may be generated due to a process deviation in a manufacturing process of the display panel and the luminance deviation may be recognized by a user as a stain, for example. In addition, the luminance deviation may be generated due to a deterioration of an element of a pixel according to a usage time of the display panel and the luminance deviation may be recognized by the user as the stain.

Embodiments of the invention provide a display apparatus reducing a power consumption by reducing memory access when compensating a stain of an image.

Embodiments of the invention also provide a virtual reality display system including the above-mentioned display apparatus.

Embodiments of the invention also provide an augmented reality display system including the above-mentioned display apparatus.

Embodiments of the invention also provide a method of driving the above-mentioned display apparatus.

In an embodiment of a display apparatus according to the invention, the display apparatus includes a display panel, a driving controller and a data driver. The driving controller operates a stain compensation for a first compensation area of the display panel in a first frame and for a second compensation area of the display panel in a second frame and generates a data signal. The data driver converts the data signal into a data voltage and outputs the data voltage to the display panel.

In an embodiment, the first compensation area may correspond to an entire area of the display panel.

In an embodiment, the first compensation area and the second compensation area may be at least partially overlapped.

In an embodiment, the second compensation area may correspond to a portion of the display panel and include a central portion of the display panel.

In an embodiment, the driving controller may receive threshold voltage compensation data, compensate a deviation of a threshold voltage of a driving transistor of a pixel of the display panel from a memory and compensate the stain compensation.

In an embodiment, the driving controller may receive deterioration compensation data, compensate a deterioration of a light-emitting element of a pixel of the display panel from a memory and compensate the stain compensation.

In an embodiment, the first compensation area may correspond to an entire area of the display panel. The second compensation area may correspond to a portion of the display panel. A ratio of a number of frames when compensating the first compensation area to a number of frames when compensating the second compensation area may be 1:1.

In an embodiment, the first compensation area may correspond to an entire area of the display panel. The second compensation area may correspond to a portion of the display panel. A ratio of a number of frames when compensating the first compensation area to a number of frames when compensating the second compensation area may be 2:1.

In an embodiment, the display apparatus may further include an eye tracker which tracks a view point of a user. The second compensation area may be displaced along the view point of the user.

In an embodiment, a size of the second compensation area may be varied according to a user setting.

In an embodiment of a virtual reality display system according to the invention, the virtual reality display system includes a lens unit, a display apparatus and a housing. The display apparatus includes a display panel including a first display area which displays a left eye image and a second display area which displays a right eye image and a driving controller which operates a stain compensation for a first compensation area of the first display area in a first frame and for a second compensation area of the first display area in a second frame to generate a data signal. The housing accommodates the lens unit and the display apparatus.

In an embodiment, the first compensation area may correspond to an entire area of the first display area.

In an embodiment, the first compensation area and the second compensation area may be at least partially overlapped.

In an embodiment, the driving controller may operate the stain compensation for a third compensation area corresponding to an entire area of the second display area in the first frame and for a fourth compensation area corresponding to a portion of the second display area in the second frame.

In an embodiment, the virtual reality display system may further include a first eye tracker which is disposed adjacent to the first display area and tracks a left eye viewpoint. The second compensation area may be displaced along the left eye viewpoint.

In an embodiment, the virtual reality display system may further include a second eye tracker which is disposed adjacent to the second display area and tracks a right eye viewpoint. The fourth compensation area may be displaced along the right eye viewpoint.

In an embodiment of an augmented reality display system according to the invention, the augmented reality display system includes a right eye frame, a left eye frame, a display apparatus and a driving controller. The display apparatus includes a display panel including a first display area which is disposed inside the right eye frame and displays a right eye image and a second display area which is disposed inside the left eye frame and displays a left eye image. The driving controller operates a stain compensation for a first compensation area of the first display area in a first frame and for a second compensation area of the first display area in a second frame.

In an embodiment, the first compensation area may correspond to an entire area of the first display area.

In an embodiment, the first compensation area and the second compensation area may be at least partially overlapped.

In an embodiment, the driving controller may operate the stain compensation for a third compensation area corresponding to an entire area of the second display area in the first frame and for a fourth compensation area corresponding to a portion of the second display area in the second frame.

In an embodiment, the augmented reality display system may further include a first eye tracker which is disposed at the right eye frame and tracks a right eye viewpoint. The second compensation area may be displaced along the right eye viewpoint.

In an embodiment, the augmented reality display system may further include a second eye tracker which is disposed at the left eye frame and tracks a left eye viewpoint. The fourth compensation area may be displaced along the left eye viewpoint.

In an embodiment, the augmented reality display system may further include an eye tracker which is disposed at a bridge connecting the right eye frame and the left eye frame and tracks a viewpoint of a user. The second compensation area and the fourth compensation area may be displaced along the viewpoint of the user.

In an embodiment of a method of driving a display apparatus according to the invention, the method includes operating a stain compensation for a first compensation area of a display panel in a first frame, operating the stain compensation for a second compensation area of the display panel in a second frame, converting a data signal generated by the stain compensation into a data voltage and outputting the data voltage to the display panel.

In an embodiment, the first compensation area may correspond to an entire area of the display panel.

In an embodiment, the first compensation area and the second compensation area may be at least partially overlapped.

In an embodiment, the second compensation area may correspond to a portion of the display panel and include a central portion of the display panel.

In an embodiment, the method may further include tracking a viewpoint of a user. The second compensation area may be displaced along the viewpoint of the user.

According to the display apparatus, the virtual reality display system including the display apparatus, the augmented reality display system including the display apparatus and the method of driving the display apparatus, the driving controller may operate a stain compensation for the first compensation area corresponding to an entire area of the display panel in the first frame and a stain compensation for the second compensation area corresponding to a portion of the display panel in the second frame. Thus, the memory access may be reduced when compensating the stain of the image so that the power consumption of the display apparatus may be reduced.

In addition, the display apparatus may further include the eye tracker tracking the user's viewpoint and moves the second compensation area according to the user's viewpoint. Thus, the power consumption of the display apparatus may be reduced and the display quality may be enhanced.

BRIEF DESCRIPTION OF THE DRAWINGS

The above and other features and advantages of the invention will become more apparent by describing in detailed embodiments thereof with reference to the accompanying drawings, in which.

DETAILED DESCRIPTION

Figure 1:
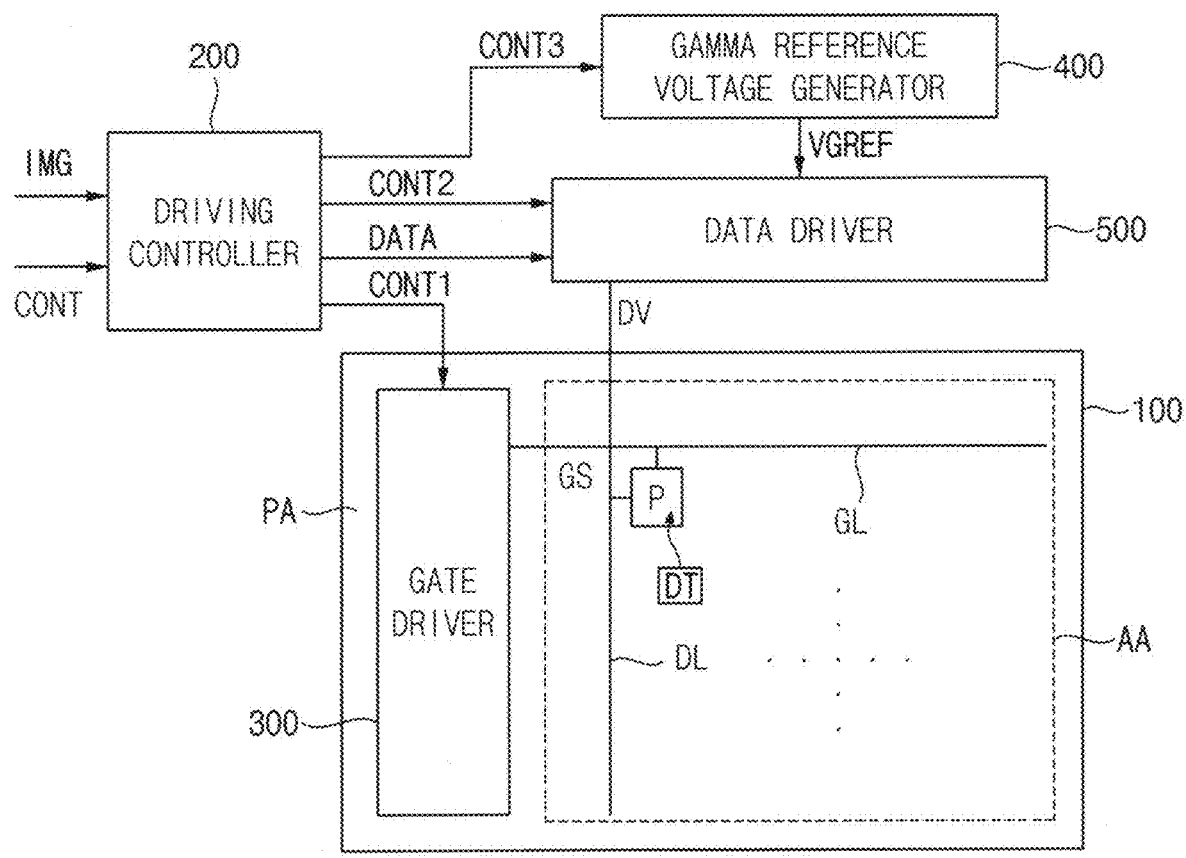
FIG. 1 is a block diagram illustrating an embodiment of a display apparatus according to the invention.

Hereinafter, the invention will be explained in detail with reference to the accompanying drawings.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

FIG. 1 is a block diagram illustrating an embodiment of a display apparatus according to the invention.

Referring to FIG. 1, the display apparatus includes a display panel 100 and a display panel driver. The display panel driver includes a driving controller 200, a gate driver 300, a gamma reference voltage generator 400 and a data driver 500.

In an embodiment, the driving controller 200 and the data driver 500 may be unitary. In an embodiment, the driving controller 200, the gamma reference voltage generator 400 and the data driver 500 may be unitary, for example. In an embodiment, the driving controller 200, the gate driver 300, the gamma reference voltage generator 400 and the data driver 500 may be unitary, for example. A driving module including at least the driving controller 200 and the data driver 500 which are unitary may be referred to as a timing controller embedded data driver ("TED").

The display panel 100 includes a display region AA and a peripheral region PA adjacent to the display region AA.

In an embodiment, the display panel 100 may be an organic light-emitting diode display panel including organic light-emitting diodes, for example. In an alternative embodiment, the display panel 100 may be a liquid crystal display panel including liquid crystal molecules.

The display panel 100 includes a plurality of gate lines GL, a plurality of data lines DL and a plurality of pixels P electrically connected to corresponding gate lines GL of the plurality of gate lines GL and corresponding data lines DL of the plurality of data lines DL. The gate lines GL extend in a first direction D1 and the data lines DL extend in a second direction D2 crossing the first direction D1.

The driving controller 200 receives input image data IMG and an input control signal CONT from an external apparatus. In an embodiment, the driving controller 200 may receive the input image data IMG and the input control signal CONT from a host, for example. The input image data IMG may include red image data, green image data and blue image data. The input image data IMG may include white image data. The input image data IMG may include magenta image data, yellow image data and cyan image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The gate driver 300 generates gate signals GS driving the gate lines GL in response to the first control signal CONT1 received from the driving controller 200. The gate driver 300 outputs the gate signals GS to the gate lines GL. In an embodiment, the gate driver 300 may sequentially output the gate signals GS to the gate lines GL, for example. In an embodiment, the gate driver 300 may be integrated on the peripheral region PA of the display panel 100, for example. In an embodiment, the gate driver 300 may be disposed (e.g., mounted) on the peripheral region PA of the display panel 100, for example.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages DV having an analog type using the gamma reference voltages VGREF. The data driver 500 outputs the data voltages DV to the data lines DL. In an embodiment, the data driver 500 may be integrated on the peripheral region PA of the display panel 100, for example. In an embodiment, the data driver 500 may be disposed (e.g., mounted) on the peripheral region PA of the display panel 100, for example.

Figure 2:
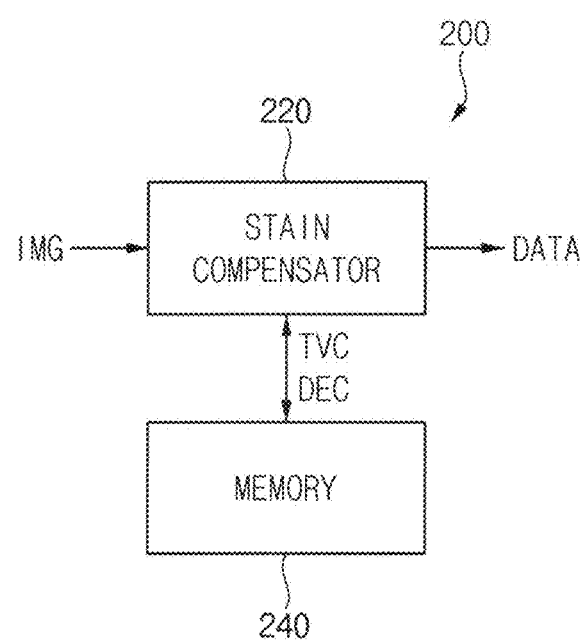
FIG. 2 is a block diagram illustrating a driving controller of FIG. 1.
Figure 3A:
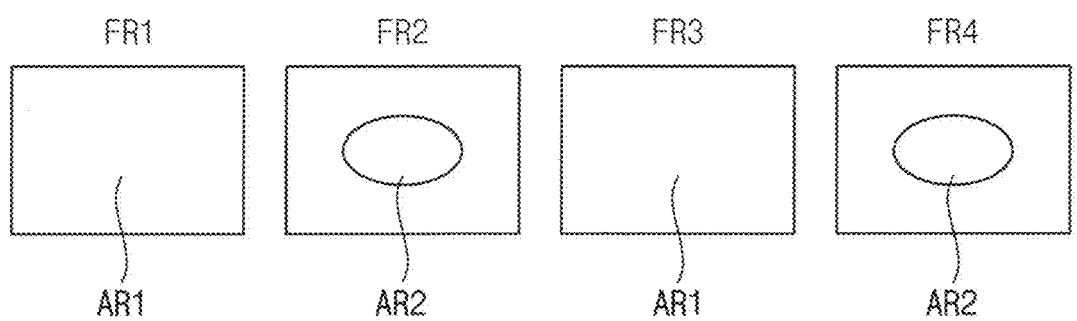
FIGS. 3A and 3B are conceptual diagrams illustrating an operation of a stain compensator of FIG. 2.
Figure 3B:
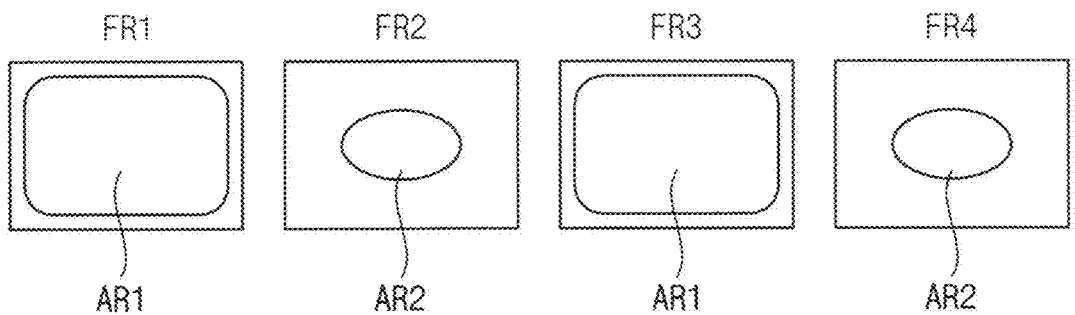

FIG. 2 is a block diagram illustrating the driving controller 200 of FIG. 1. FIGS. 3A and 3B are conceptual diagrams illustrating an operation of a stain compensator 220 of FIG. 2.

Referring to FIGS. 1 to 3B, the driving controller 200 may operate a stain compensation for a first compensation area AR1 of the display panel 100 in a predetermined frame and a stain compensation for a second compensation area AR2 of the display panel 100 in another predetermined frame to generate the data signal DATA.

As shown in FIG. 3A, the first compensation area AR1 may correspond to an entire area of the display panel 100. The second compensation area AR2 may correspond to a portion of the display panel 100. The first compensation area AR1 and the second compensation area AR2 may be at least partially overlapped.

As shown in FIG. 3B, the first compensation area AR1 may correspond to a portion of the display panel 100. The second compensation area AR2 may correspond to another portion of the display panel 100. The first compensation area AR1 and the second compensation area AR2 may be at least partially overlapped. In an embodiment, a size of the first compensation area AR1 may be greater than a size of the second compensation area AR2, for example. The second compensation area AR2 may be included in the first compensation area AR1.

In an embodiment, the driving controller 200 may operate the first compensation area AR1 in a first frame FR1 and the second compensation area AR2 in a second frame FR2, for example. In addition, the driving controller 200 may operate the first compensation area AR1 in a third frame FR3 and the second compensation area AR2 in a fourth frame FR4.

In an embodiment, the second compensation area AR2 may include a central portion of the display panel 100, for example. In an embodiment, the second compensation area AR2 may have an elliptical shape, for example. In an embodiment, when the display panel 100 has a horizontally long quadrangular (e.g., rectangular) shape, the second compensation area AR2 may have a horizontally long elliptical shape, for example. In an embodiment, when the display panel 100 has a vertically long quadrangular (e.g., rectangular) shape, the second compensation area AR2 may have a vertically long elliptical shape, for example. In an embodiment, the compensation area AR2 may have a circular shape, for example. In an embodiment, when the display panel 100 has a square shape, the second compensation area AR2 may have the circular shape, for example.

When the stain compensation is operated on the entire area (e.g. the first compensation area AR1 of FIG. 3A) of the display panel 100, the stain of the entire are of the display panel 100 is compensated so that the display quality of the display panel 100 is enhanced but an amount of memory access for the stain compensation is increased and accordingly, the power consumption of the display apparatus may be increased.

In contrast, when the stain compensation is operated on a predetermined portion (e.g. the second compensation area AR2) of the display panel 100, the stain of the predetermined portion of the display panel 100 is compensated so that the display quality of the display panel 100 may slightly decrease but an amount of memory access for the stain compensation is decreased and accordingly, the power consumption of the display apparatus may be reduced.

In the illustrated embodiment, a ratio of a number of frames when compensating the first compensation area AR1 corresponding to the entire area of the display panel 100 to a number of frames when compensating the second compensation area AR2 corresponding to a portion of the display panel 100 may be 1:1. As explained above, the stain compensation for the entire area of the display panel 100 and the stain compensation for a portion of the display panel 100 are alternately applied so that the display quality of the display panel 100 may be properly enhanced and the power consumption of the display apparatus may be properly reduced. Herein, the second compensation area AR2 may include a central portion of the display panel 100 where a user's viewpoint is likely to be located so that a degree of reduction of the display quality of the display panel 100 may be decreased.

In an embodiment, the driving controller 200 may include a stain compensator 220 and a memory 240, for example.

The stain compensator 220 may receive the input image data IMG. The stain compensator 220 may generate the data signal DATA based on the input image data IMG. The stain compensator 220 may operate a stain compensation for the first compensation area AR1 in the first frame FR1 and a stain compensation for the second compensation area AR2 in the second frame FR2 to generate the data signal DATA.

In an embodiment, the stain compensator 220 may receive threshold voltage compensation data TVC for compensating a deviation of a threshold voltage of a driving transistor DT of the pixel P of the display panel 100 from the memory 240 to compensate the stain compensation, for example.

In an embodiment, the stain compensator 220 may receive deterioration compensation data DEC for compensating a deterioration of a light-emitting element of the pixel P of the display panel 100 from the memory 240 to compensate the stain compensation, for example.

In the illustrated embodiment, the driving controller 200 may operate a stain compensation for the first compensation area AR1 corresponding to the entire area of the display panel 100 in the first frame FR1 and a stain compensation for the second compensation area AR2 corresponding to a portion of the display panel 100 in the second frame FR2. Thus, the memory access may be reduced when compensating the stain of the image so that the power consumption of the display apparatus may be reduced.

Figure 4:
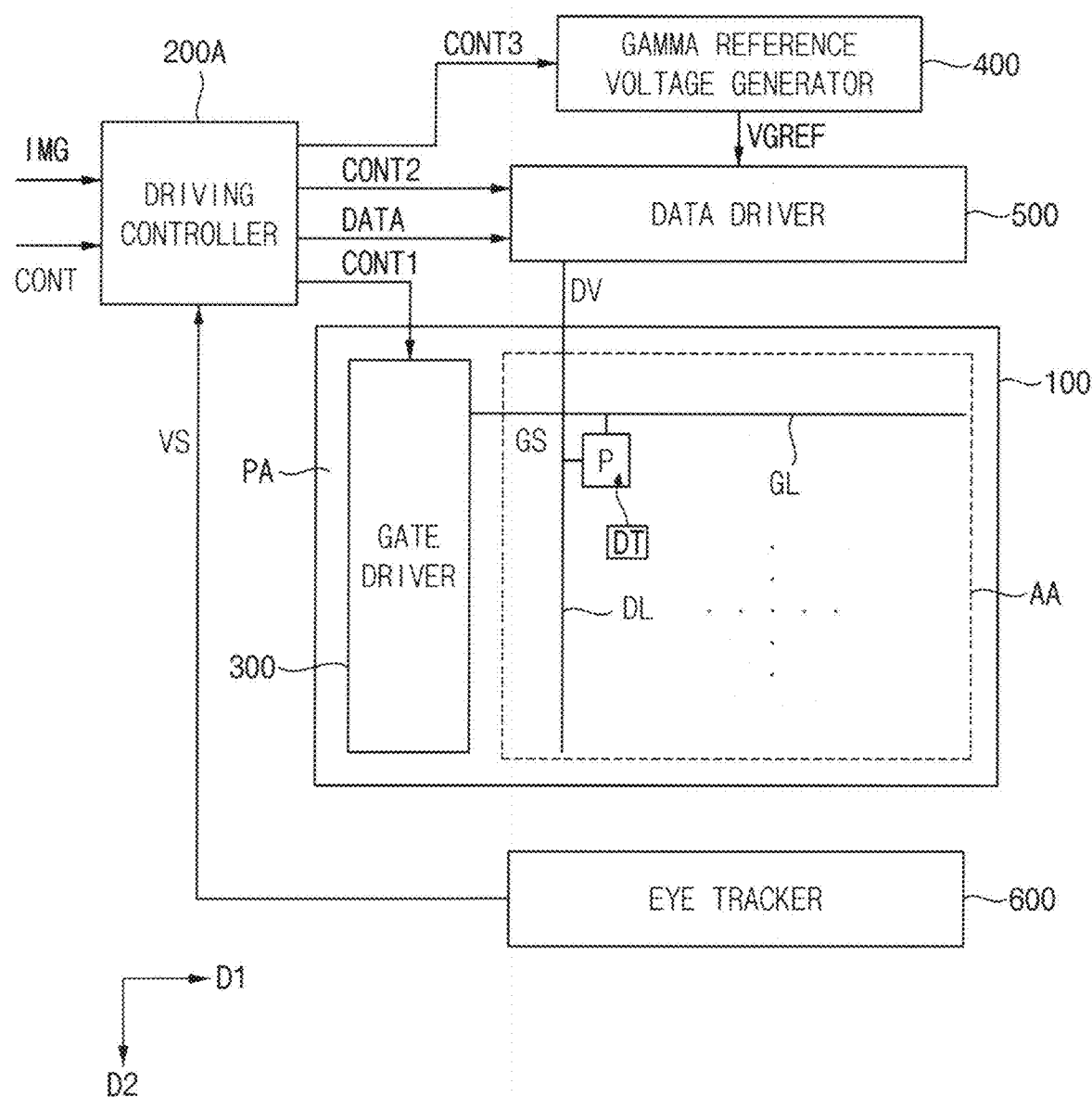
FIG. 4 is a block diagram illustrating an embodiment of a display apparatus according to the invention.
Figure 5:
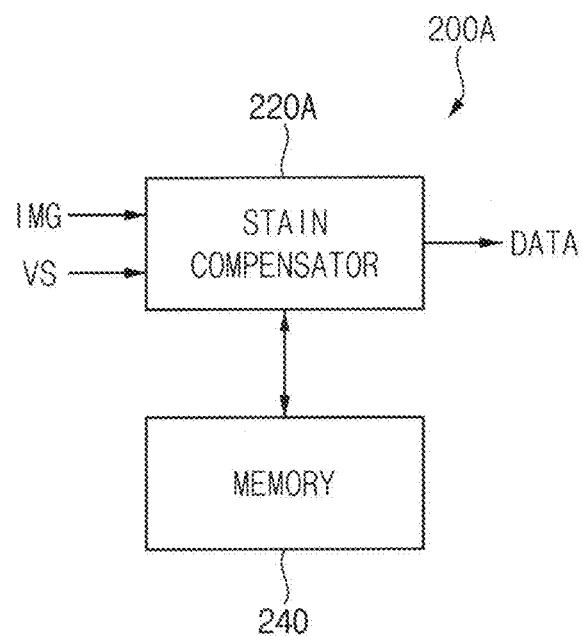
FIG. 5 is a block diagram illustrating a driving controller of FIG. 4.
Figure 6:
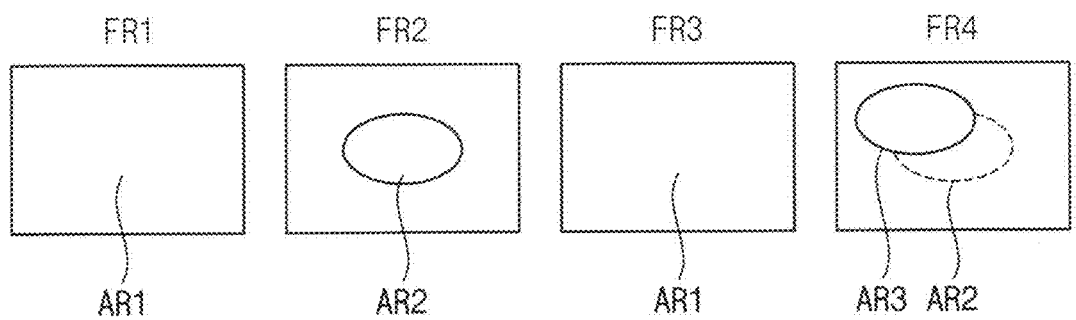
FIG. 6 is a conceptual diagram illustrating an operation of a stain compensator of FIG. 5.

FIG. 4 is a block diagram illustrating an embodiment of a display apparatus according to the invention. FIG. 5 is a block diagram illustrating a driving controller 200A of FIG. 4. FIG. 6 is a conceptual diagram illustrating an operation of a stain compensator 220A of FIG. 5.

The display apparatus in the illustrated embodiment is substantially the same as the display apparatus of the previous embodiment explained referring to FIGS. 1 to 3B except that the display apparatus further includes an eye tracker. Thus, the same reference numerals will be used to refer to the same or like parts as those described in the previous embodiment of FIGS. 1 to 3B and any repetitive explanation concerning the above elements will be omitted.

Referring to FIGS. 4 to 6, the display apparatus includes a display panel 100 and a display panel driver. The display panel driver includes a driving controller 200A, a gate driver 300, a gamma reference voltage generator 400 and a data driver 500.

The driving controller 200A may operate a stain compensation for a first compensation area AR1 of the display panel 100 in a predetermined frame and a stain compensation for a second compensation area AR2 of the display panel 100 in another predetermined frame to generate the data signal DATA. In an embodiment, like FIG. 3A, the first compensation area AR1 may correspond to an entire area of the display panel 100 and the second compensation area AR2 may correspond to a portion of the display panel 100, for example. In an embodiment, like FIG. 3B, the first compensation area AR1 may correspond to a portion of the display panel 100, the second compensation area AR2 may correspond to a portion of the display panel 100 and the second compensation area AR2 may be included in the first compensation area AR1, for example.

In the illustrated embodiment, the display apparatus may further include the eye tracker 600. The eye tracker 600 may output a viewpoint signal VS representing a user's viewpoint to the driving controller 200A.

The driving controller 200A may include a stain compensator 220A and a memory 240.

The stain compensator 220A may receive the input image data IMG and the viewpoint signal VS. The stain compensator 220A may generate the data signal DATA based on the input image data IMG and the user's viewpoint.

The stain compensator 220A may operate a stain compensation for the first compensation area AR1 in the first frame FR1 and a stain compensation for the second compensation area AR2 in the second frame FR2 to generate the data signal DATA.

In the illustrated embodiment, the second compensation area AR2 may be displaced along the user's viewpoint.

The stain compensator 220A may operate a stain compensation for the first compensation area AR1 in a third frame FR3 and a stain compensation for a third compensation area AR3 which is displaced from the second compensation area AR2 along the user's viewpoint in a fourth frame FR4.

In the illustrated embodiment, the user's viewpoint may be displaced from a central portion of the display panel 100 to an upper left portion of the display panel 100 in the fourth frame FR4. However, the invention is not limited to the illustrated embodiment, and the user's viewpoint may be displaced to another portion of the display panel 100. Partial compensation areas (e.g. AR2 and AR3) are displaced along the user's viewpoint so that a decrease of the display quality of the display panel 100 in partial compensation frames (e.g. FR2 and FR4) may be prevented.

In an embodiment, a size of the third compensation area AR3 may be substantially the same as that of the second compensation area AR2, for example.

In the illustrated embodiment, the driving controller 200A may operate a stain compensation for the first compensation area AR1 corresponding to the entire area of the display panel 100 in the first frame FR1 and a stain compensation for the second compensation area AR2 corresponding to a portion of the display panel 100 in the second frame FR2. Thus, the memory access may be reduced when compensating the stain of the image so that the power consumption of the display apparatus may be reduced.

In addition, the display apparatus may further include the eye tracker 600 tracking the user's viewpoint and moves the second compensation area AR2 according to the user's viewpoint. Thus, the power consumption of the display apparatus may be reduced and the display quality may be enhanced.

Figure 7:
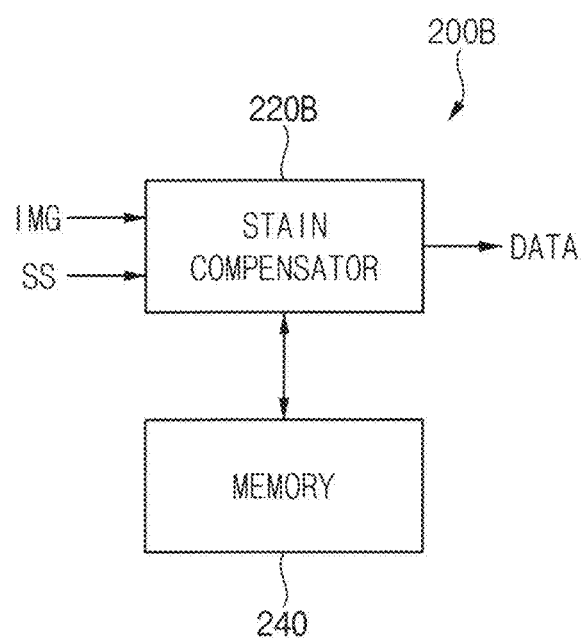
FIG. 7 is a block diagram illustrating an embodiment of a driving controller of a display apparatus according to the invention.
Figure 8:
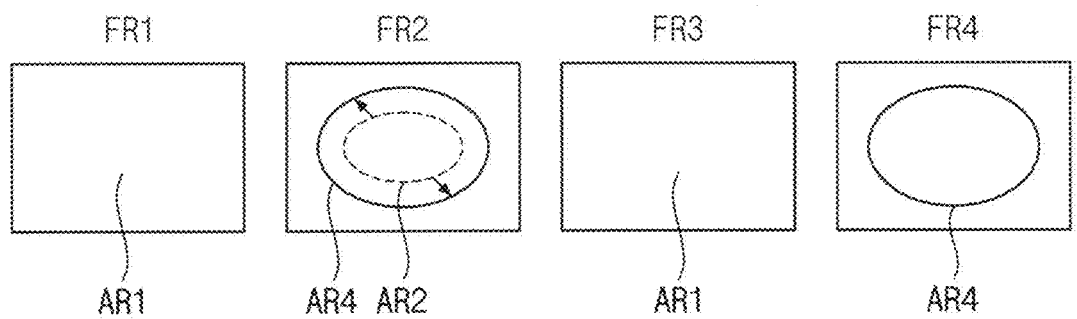
FIG. 8 is a conceptual diagram illustrating an operation of a stain compensator of FIG. 7.

FIG. 7 is a block diagram illustrating an embodiment of a driving controller 200B of a display apparatus according to the invention. FIG. 8 is a conceptual diagram illustrating an operation of a stain compensator 220B of FIG. 7.

The display apparatus in the illustrated embodiment is substantially the same as the display apparatus of the previous embodiment explained referring to FIGS. 1 to 3B except that a size of the partial compensation area is varied according to a user setting. Thus, the same reference numerals will be used to refer to the same or like parts as those described in the previous embodiment of FIGS. 1 to 3B and any repetitive explanation concerning the above elements will be omitted.

Referring to FIGS. 1, 7 and 8, the display apparatus includes a display panel 100 and a display panel driver. The display panel driver includes a driving controller 200B, a gate driver 300, a gamma reference voltage generator 400 and a data driver 500.

The driving controller 200B may operate a stain compensation for a first compensation area AR1 of the display panel 100 in a predetermined frame and a stain compensation for a second compensation area AR2 or AR4 of the display panel 100 in another predetermined frame to generate the data signal DATA. In an embodiment, like FIG. 3A, the first compensation area AR1 may correspond to an entire area of the display panel 100 and the second compensation area AR2 or AR4 may correspond to a portion of the display panel 100, for example. In an embodiment, like FIG. 3B, the first compensation area AR1 may correspond to a portion of the display panel 100, the second compensation area AR2 or AR4 may correspond to a portion of the display panel 100 and the second compensation area AR2 or AR4 may be included in the first compensation area AR1, for example.

In the illustrated embodiment, a size of the second area AR2 or AR4 may be varied according to the user setting SS. In an embodiment, the size of the second area AR2 or AR4 may be adjusted according to a degree of visibility of the stain by the user, for example. The degree of visibility of the stain by the user may be determined by the user setting SS.

The driving controller 200B may include a stain compensator 220B and a memory 240.

The stain compensator 220B may receive the input image data IMG and the user setting SS. The stain compensator 220B may generate the data signal DATA based on the input image data IMG and the user setting SS.

In the illustrated embodiment, the size of the second compensation area may be enlarged from AR2 of FIGS. 2 to AR4 of FIG. 8 by the user setting SS.

The stain compensator 220B may operate a stain compensation for the first compensation area AR1 in the first frame FR1 and a stain compensation for an enlarged second compensation area AR4 in the second frame FR2.

The stain compensator 220B may operate a stain compensation for the first compensation area AR1 in a third frame FR3 and a stain compensation for the enlarged second compensation area AR4 in a fourth frame FR4.

In the illustrated embodiment, the driving controller 200B may operate a stain compensation for the first compensation area AR1 corresponding to the entire area of the display panel 100 in the first frame FR1 and a stain compensation for the second compensation area AR2 corresponding to a portion of the display panel 100 in the second frame FR2. Thus, the memory access may be reduced when compensating the stain of the image so that the power consumption of the display apparatus may be reduced.

Figure 9:
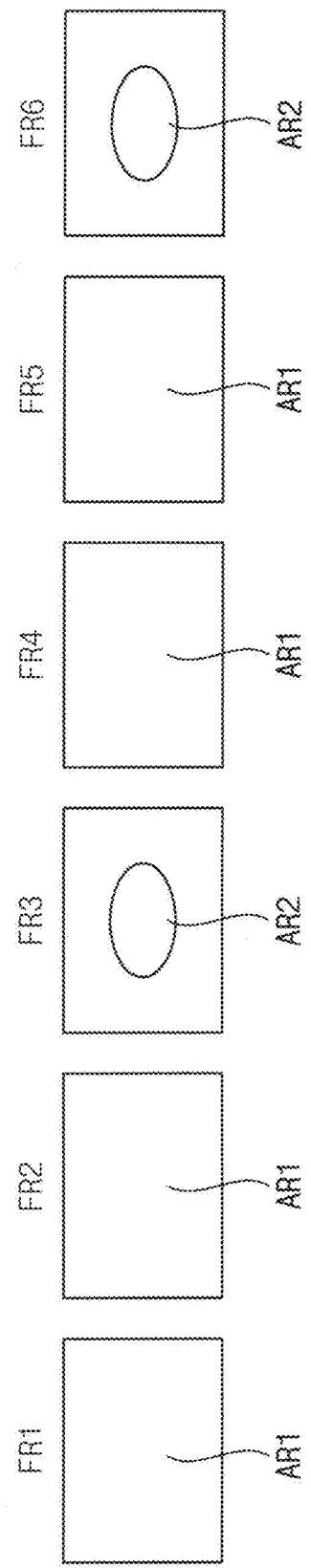
FIG. 9 is a conceptual diagram illustrating an embodiment of an operation of a stain compensator of a display apparatus according to the invention.

FIG. 9 is a conceptual diagram illustrating an embodiment of an operation of a stain compensator of a display apparatus according to the invention.

The display apparatus in the illustrated embodiment is substantially the same as the display apparatus of the previous embodiment explained referring to FIGS. 1 to 3B except for the number of the frames when compensating the first compensation area corresponding to the entire area of the display panel and the number of frames when compensating the second compensation area corresponding to a portion of the display panel. Thus, the same reference numerals will be used to refer to the same or like parts as those described in the previous embodiment of FIGS. 1 to 3B and any repetitive explanation concerning the above elements will be omitted.

Referring to FIGS. 1, 2 and 9, the display apparatus includes a display panel 100 and a display panel driver. The display panel driver includes a driving controller 200, a gate driver 300, a gamma reference voltage generator 400 and a data driver 500.

The driving controller 200 may operate a stain compensation for a first compensation area AR1 of the display panel 100 in a predetermined frame and a stain compensation for a second compensation area AR2 of the display panel 100 in another predetermined frame to generate the data signal DATA. In an embodiment, like FIG. 3A, the first compensation area AR1 may correspond to an entire area of the display panel 100 and the second compensation area AR2 may correspond to a portion of the display panel 100, for example. In an embodiment, like FIG. 3B, the first compensation area AR1 may correspond to a portion of the display panel 100, the second compensation area AR2 may correspond to a portion of the display panel 100 and the second compensation area AR2 may be included in the first compensation area AR1, for example.

In the illustrated embodiment, the driving controller 200 may operate a stain compensation for the first compensation area AR1 in a first frame FR1, may operate a stain compensation for the first compensation area AR1 in a second frame FR2, may operate a stain compensation for the second compensation area AR2 in a third frame FR3, may operate a stain compensation for the first compensation area AR1 in a fourth frame FR4, may operate a stain compensation for the first compensation area AR1 in a fifth frame FR5, and may operate a stain compensation for the second compensation area AR2 in a sixth frame FR6.

In the illustrated embodiment, a ratio of the number of frames when compensating the first compensation area AR1 corresponding to the entire area of the display panel 100 to the number of frames when compensating the second compensation area AR2 corresponding to a portion of the display panel 100 may be 2:1. As explained above, the stain compensation for the entire area of the display panel 100 and the stain compensation for a portion of the display panel 100 are alternately applied so that the display quality of the display panel 100 may be properly enhanced and the power consumption of the display apparatus may be properly reduced. Herein, the second compensation area AR2 may include a central portion of the display panel 100 where a user's viewpoint is likely to be located so that a degree of reduction of the display quality of the display panel 100 may be decreased.

A ratio of the number of frames when compensating the entire area of the display panel 100 to the number of frames when compensating a portion of the display panel 100 may be properly adjusted. Although the ratio of the number of frames when compensating the entire area of the display panel 100 to the number of frames when compensating a portion of the display panel 100 is 2:1 in the illustrated embodiment, the invention may not be limited thereto.

In an embodiment, the ratio of the number of frames when compensating the entire area of the display panel 100 to the number of frames when compensating a portion of the display panel 100 may be adjusted according to a degree of visibility of the stain by the user, for example. The degree of visibility of the stain by the user may be determined by the user setting SS.

In the illustrated embodiment, the driving controller 200 may operate a stain compensation for the first compensation area AR1 in the first frame FR1 and the second frame FR2 and a stain compensation for the second compensation area AR2 in the third frame FR3. Thus, the memory access may be reduced when compensating the stain of the image so that the power consumption of the display apparatus may be reduced.

Figure 10:
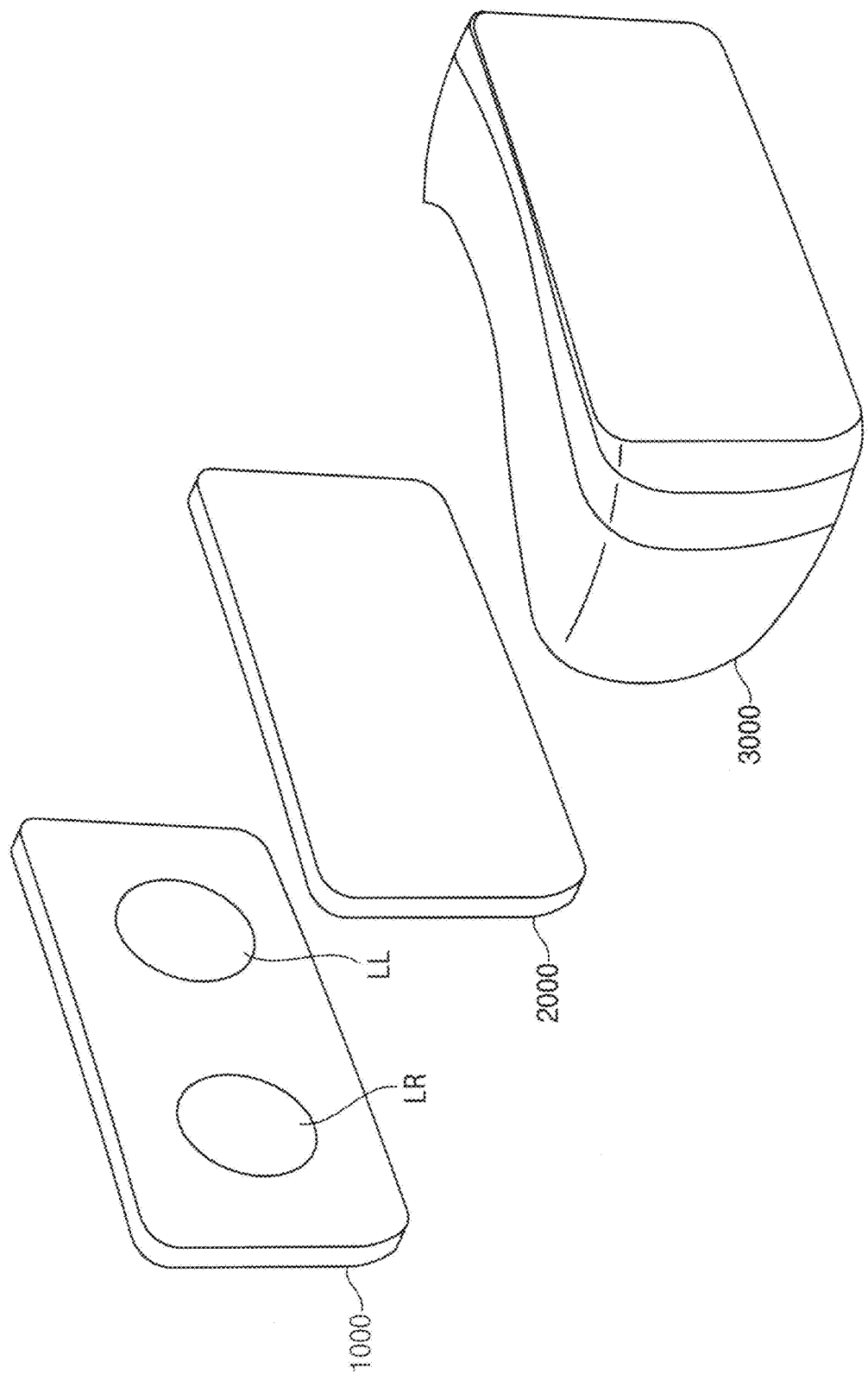
FIG. 10 is a perspective view illustrating an embodiment of a virtual reality display system according to the invention.
Figure 11:
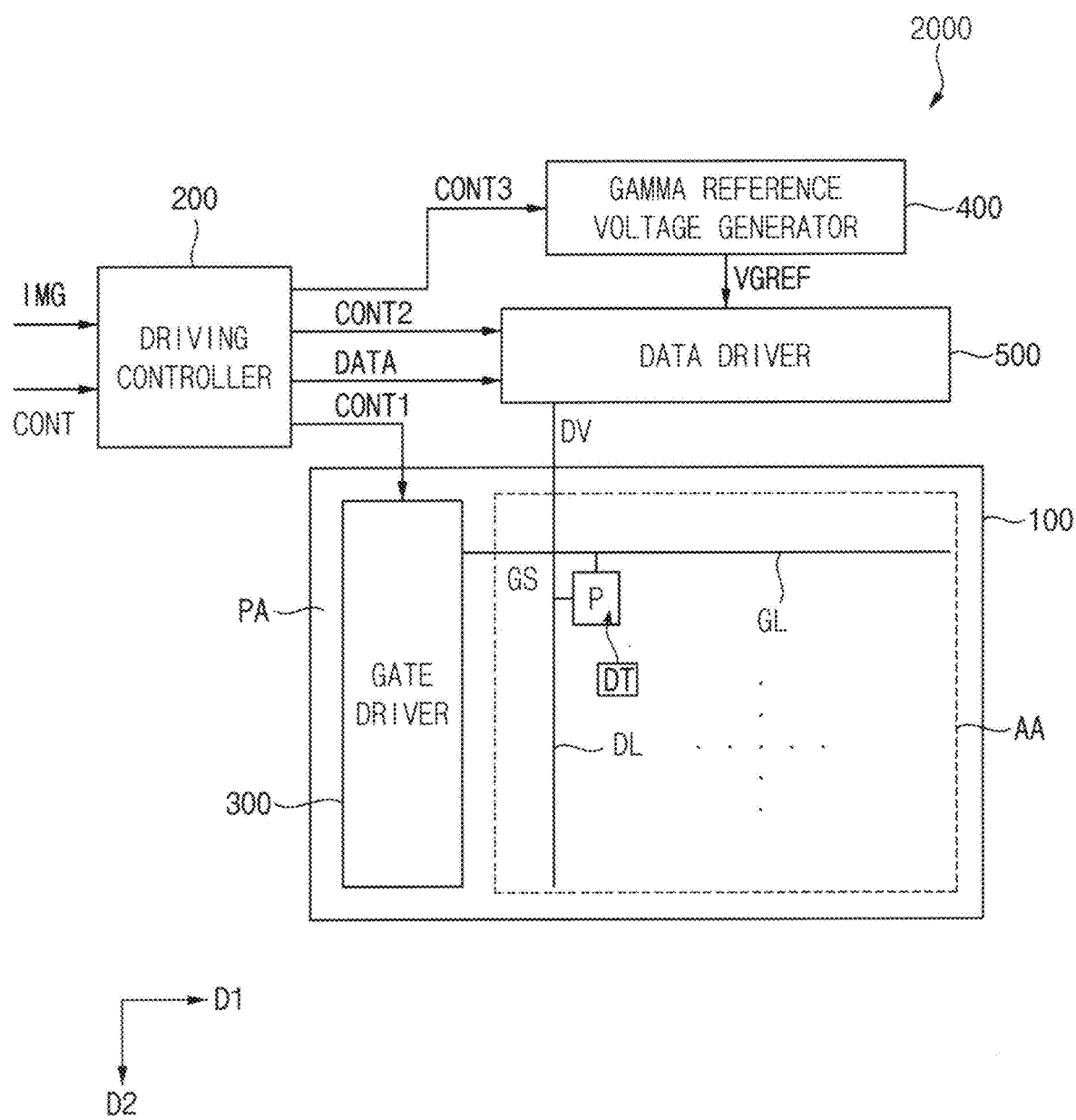
FIG. 11 is a block diagram illustrating a display apparatus of FIG. 10.
Figure 12:
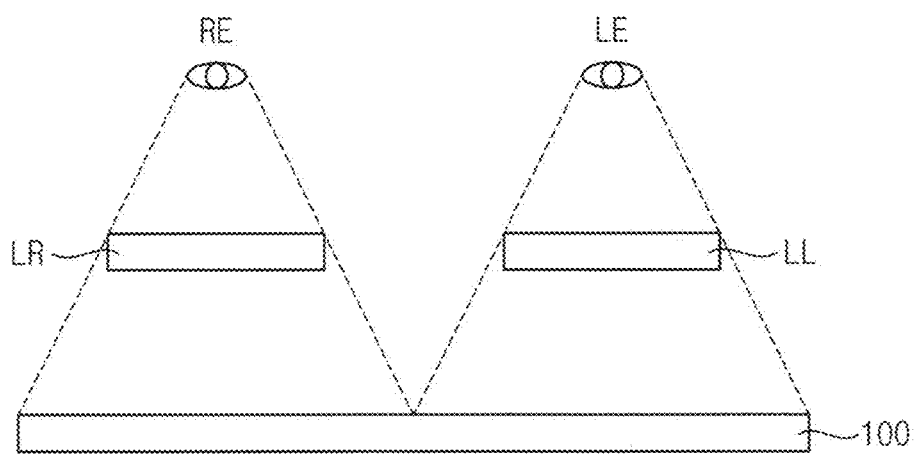
FIG. 12 is a conceptual diagram illustrating the display apparatus of FIG. 10.
Figure 13:
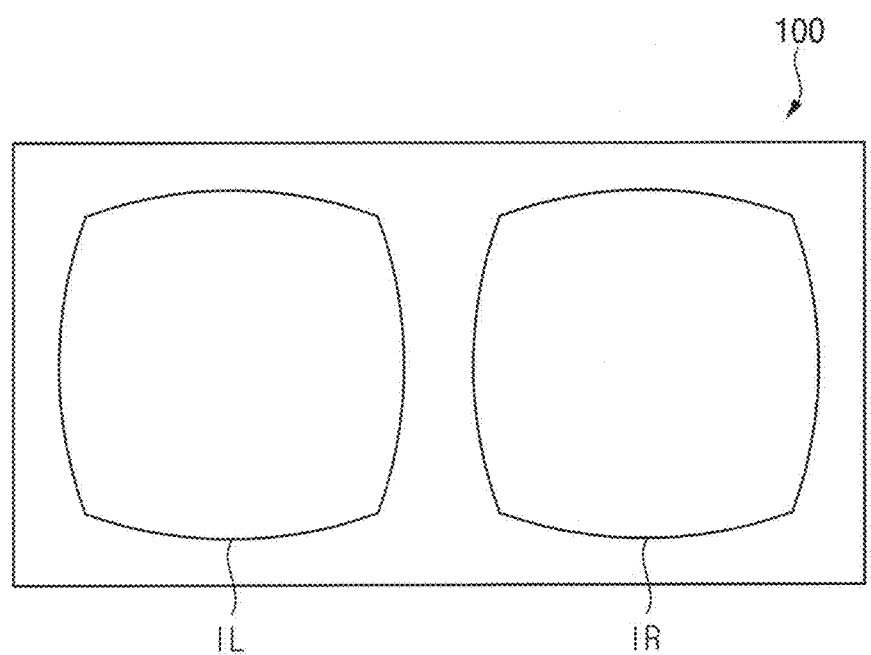
FIG. 13 is a conceptual diagram illustrating a display panel of FIG. 11.
Figure 14:
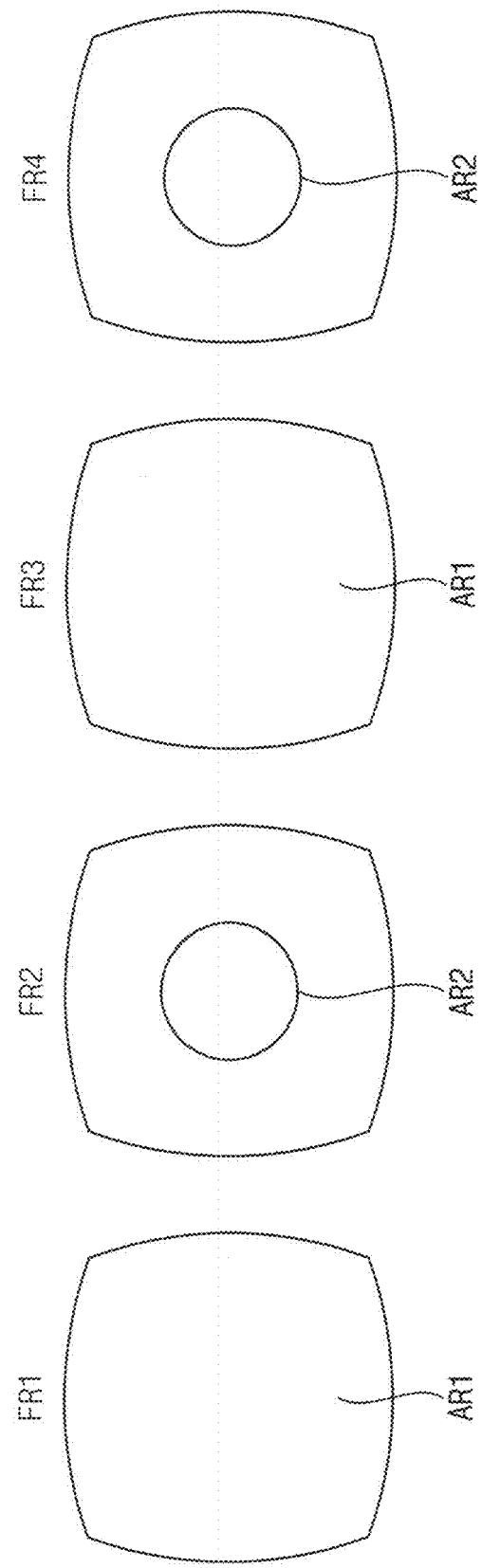
FIG. 14 is a conceptual diagram illustrating an operation of a stain compensator of a driving controller of FIG. 11.

FIG. 10 is a perspective view illustrating an embodiment of a virtual reality display system according to the invention. FIG. 11 is a block diagram illustrating a display apparatus 2000 of FIG. 10. FIG. 12 is a conceptual diagram illustrating the display apparatus 2000 of FIG. 10. FIG. 13 is a conceptual diagram illustrating a display panel 100 of FIG. 11. FIG. 14 is a conceptual diagram illustrating an operation of a stain compensator of a driving controller 200 of FIG. 11.

The illustrated embodiment exemplifies a case in which the display apparatus explained referring to FIGS. 1 to 3B is applied to a virtual reality display system. Thus, the same reference numerals will be used to refer to the same or like parts as those described in the previous embodiment of FIGS. 1 to 3B and any repetitive explanation concerning the above elements will be omitted.

Referring to FIGS. 2 and 10 to 14, the virtual reality display system includes a lens unit 1000, a display apparatus 2000 and a housing 3000. The display apparatus 2000 is disposed adjacent to the lens unit 1000. The housing 3000 may accommodate the lens unit 1000 and the display apparatus 2000. Although the lens unit 1000 and the display apparatus 2000 are accommodated in a first side of the housing 3000 in FIG. 10, the invention may not be limited thereto. In an alternative embodiment, the lens unit 1000 may be accommodated in a first side of the housing 3000 and the display apparatus may be accommodated in a second side of the housing 3000. When the lens unit 1000 and the display apparatus 2000 are accommodated in the housing 3000 in opposite sides, the housing 3000 may have a transmission area to transmit a light.

In an embodiment, the virtual reality display system may be a head mounted display system which is wearable on a head of a user, for example. Although not shown in drawing figures, the virtual reality display system may further include a head band to fix the virtual reality display system on the head of the user.

The display apparatus 2000 includes a display panel 100 and a display panel driver. The display panel driver includes a driving controller 200, a gate driver 300, a gamma reference voltage generator 400 and a data driver 500.

The display apparatus may include the display panel 100, a left eye lens LL and a right eye lens LR. The display panel 100 displays an image.

The left eye lens LL may be disposed between a user's left eye LE and the display panel 100, may refract an image on a first display area IL of the display panel 100 and may transmit the refracted image to the user's left eye LE. In an embodiment, the left eye lens LL may enlarge the image on the first display area IL and may transmit the enlarged image to the user's left eye LE, for example.

The right eye lens LR may be disposed between a user's right eye RE and the display panel 100, may refract an image on a second display area IR of the display panel 100 and may transmit the refracted image to the user's right eye RE. In an embodiment, the right eye lens LR may enlarge the image on the second display area IR and may transmit the enlarged image to the user's right eye RE, for example.

The display panel 100 may include the first display area IL displaying a left eye image and the second display area IR displaying a right eye image. In the head mounted display system, the user views the refracted image using the left eye lens LL and the right eye lens LR so that edges of the first display area IL and edges of the second display area IR may have a curved shape rather than a straight shape.

In an embodiment, areas illustrated in FIG. 14 may mean the first display area IL of FIG. 13, for example.

The driving controller 200 may operate a stain compensation for a first compensation area AR1 of the first display area IL in a predetermined frame and a stain compensation for a second compensation area AR2 of the first display area IL in another predetermined frame to generate the data signal DATA. In an embodiment, like FIG. 3A, the first compensation area AR1 may correspond to an entire area of the first display area IL and the second compensation area AR2 may correspond to a portion of the first display area IL, for example. In an embodiment, like FIG. 3B, the first compensation area AR1 may correspond to a portion of the first display area IL, the second compensation area AR2 may correspond to a portion of the first display area IL and the second compensation area AR2 may be included in the first compensation area AR1, for example.

In an embodiment, the driving controller 200 may operate the first compensation area AR1 in a first frame FR1 and the second compensation area AR2 in a second frame FR2, for example. In addition, the driving controller 200 may operate the first compensation area AR1 in a third frame FR3 and the second compensation area AR2 in a fourth frame FR4.

In an embodiment, areas illustrated in FIG. 14 may mean the second display area IR of FIG. 13, for example.

The driving controller 200 may operate a stain compensation for a first compensation area AR1 of the second display area IR in a predetermined frame and a stain compensation for a second compensation area AR2 of the second display area IR in another predetermined frame to generate the data signal DATA. In an embodiment, like FIG. 3A, the first compensation area AR1 may correspond to an entire area of the second display area IR and the second compensation area AR2 may correspond to a portion of the second display area IR, for example. In an embodiment, like FIG. 3B, the first compensation area AR1 may correspond to a portion of the second display area IR, the second compensation area AR2 may correspond to a portion of the second display area IR and the second compensation area AR2 may be included in the first compensation area AR1, for example.

In an embodiment, the driving controller 200 may operate the first compensation area AR1 in a first frame FR1 and the second compensation area AR2 in a second frame FR2, for example. In addition, the driving controller 200 may operate the first compensation area AR1 in a third frame FR3 and the second compensation area AR2 in a fourth frame FR4.

In the illustrated embodiment, the driving controller 200 may operate a stain compensation for the first compensation area AR1 corresponding to the entire area of the first display area IL and the second display area IR in the first frame FR1 and a stain compensation for the second compensation area AR2 corresponding to a portion of the first display area IL and the second display area IR in the second frame FR2. Thus, the memory access may be reduced when compensating the stain of the image so that the power consumption of the display apparatus may be reduced.

Figure 15:
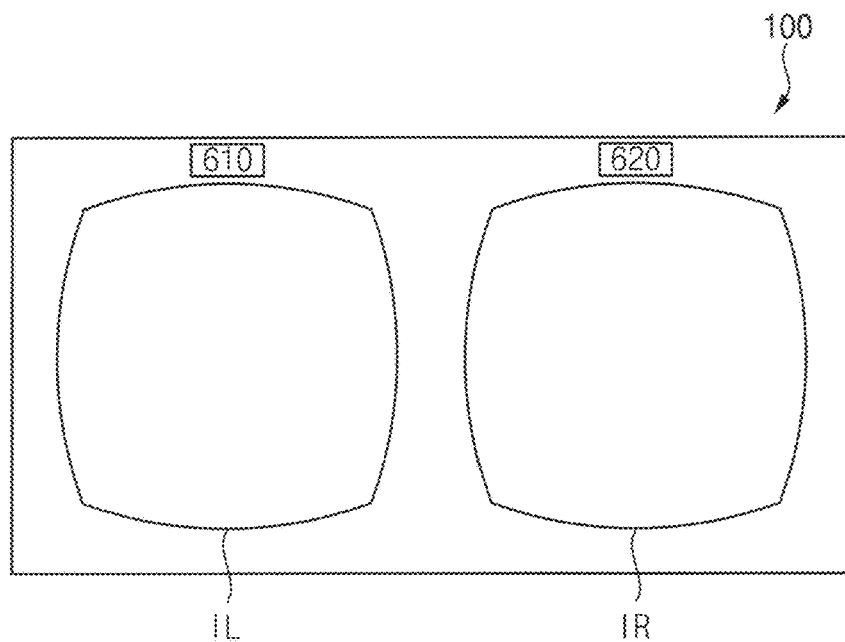
FIG. 15 is a conceptual diagram illustrating an embodiment of a display panel of a virtual reality display system according to the invention.

FIG. 15 is a conceptual diagram illustrating an embodiment of a display panel of a virtual reality display system according to the invention.

The virtual reality display system in the illustrated embodiment is substantially the same as the virtual reality display system of the previous embodiment explained referring to FIGS. 10 to 14 except that the virtual reality display system further includes an eye tracker. Thus, the same reference numerals will be used to refer to the same or like parts as those described in the previous embodiment of FIGS. 10 to 14 and any repetitive explanation concerning the above elements will be omitted.

Referring to FIGS. 10 to 12, 14 and 15, the driving controller 200 may operate a stain compensation for a first compensation area AR1 of the first display area IL in a predetermined frame and a stain compensation for a second compensation area AR2 of the first display area IL in another predetermined frame to generate the data signal DATA. In an embodiment, like FIG. 3A, the first compensation area AR1 may correspond to an entire area of the first display area IL and the second compensation area AR2 may correspond to a portion of the first display area IL, for example. In an embodiment, like FIG. 3B, the first compensation area AR1 may correspond to a portion of the first display area IL, the second compensation area AR2 may correspond to a portion of the first display area IL and the second compensation area AR2 may be included in the first compensation area AR1, for example.

In an embodiment, the driving controller 200 may operate the first compensation area AR1 in a first frame FR1 and the second compensation area AR2 in a second frame FR2, for example. In addition, the driving controller 200 may operate the first compensation area AR1 in a third frame FR3 and the second compensation area AR2 in a fourth frame FR4.

In the illustrated embodiment, the virtual reality display system may further include a first eye tracker 610 disposed adjacent to the first display area IL and tracking a user's left eye viewpoint. Herein, the second compensation area AR2 of the first display area IL may be displaced according to the user's left eye viewpoint.

In the illustrated embodiment, the virtual reality display system may further include a second eye tracker 620 disposed adjacent to second first display area IR and tracking a user's right eye viewpoint. Herein, the second compensation area AR2 of the second display area IR may be displaced according to the user's right eye viewpoint.

In the illustrated embodiment, the driving controller 200 may operate a stain compensation for the first compensation area AR1 corresponding to the entire area of the first display area IL and the second display area IR in the first frame FR1 and a stain compensation for the second compensation area AR2 corresponding to a portion of the first display area IL and the second display area IR in the second frame FR2. Thus, the memory access may be reduced when compensating the stain of the image so that the power consumption of the display apparatus may be reduced.

Figure 16:
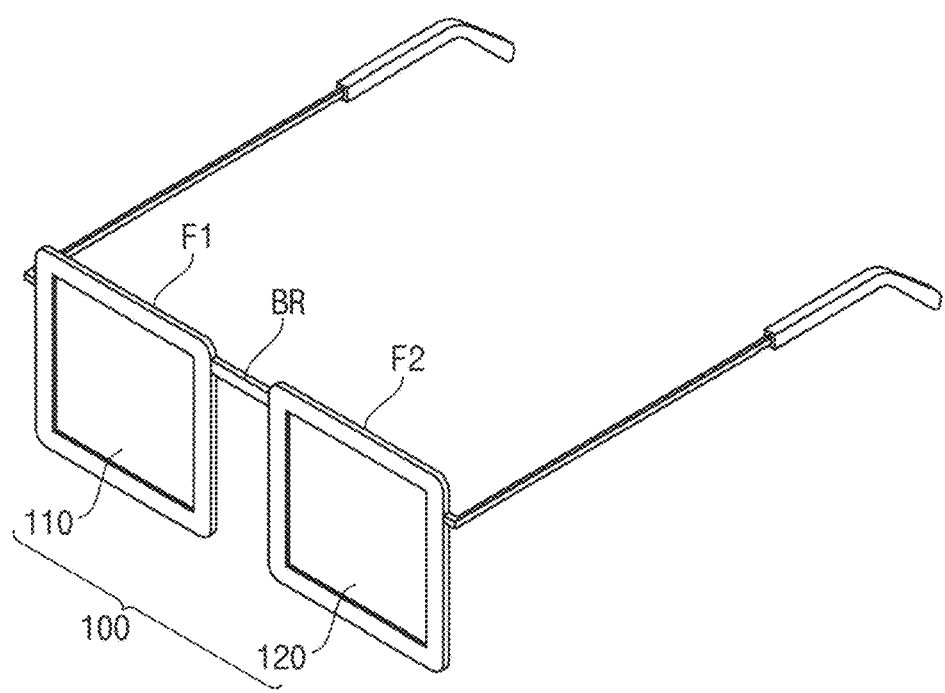
FIG. 16 is a perspective view illustrating an augmented reality display system according to the invention.
Figure 17:
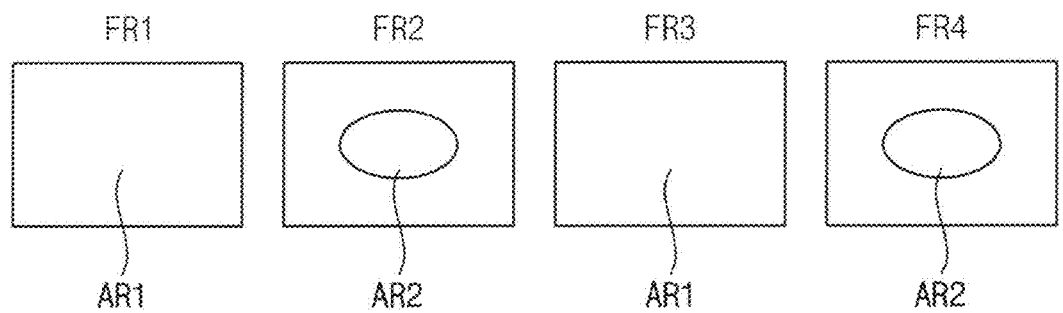
FIG. 17 is a conceptual diagram illustrating an operation of a stain compensator of the augmented reality display system of FIG. 16.

FIG. 16 is a perspective view illustrating an embodiment of an augmented reality display system according to the invention. FIG. 17 is a conceptual diagram illustrating an operation of a stain compensator of the augmented reality display system of FIG. 16.

The illustrated embodiment exemplifies a case in which the display apparatus explained referring to FIGS. 1 to 3B is applied to an augmented reality display system. Thus, the same reference numerals will be used to refer to the same or like parts as those described in the previous embodiment of FIGS. 1 to 3B and any repetitive explanation concerning the above elements will be omitted.

Referring to FIGS. 2, 16 and 17, the augmented reality display system includes a right eye frame F1, a left eye frame F2, a first display area 110 disposed inside the right eye frame F1 and displaying a right eye image, a second display area 120 disposed inside the left eye frame F2 and displaying a left eye image and a driving controller operating a stain compensation of the display panel 100.

The augmented reality display system may further include a bridge BR connecting the right eye frame F1 and the left eye frame F2.

In an embodiment, the augmented reality display system may be smart glasses worn on user's eyes, for example.

The augmented reality display system may include a display panel driver driving the display panel 100 as shown in FIG. 1. The display panel driver may include the driving controller 200, a gate driver 300, a gamma reference voltage generator 400 and a data driver 500. The display panel driver may be disposed at the right eye frame F1, the left eye frame F2 or the bridge BR.

In an embodiment, areas illustrated in FIG. 17 may mean the first display area 110 of FIG. 16, for example.

The driving controller 200 may operate a stain compensation for a first compensation area AR1 of the first display area 110 in a predetermined frame and a stain compensation for a second compensation area AR2 of the first display area 110 in another predetermined frame to generate the data signal DATA. In an embodiment, like FIG. 3A, the first compensation area AR1 may correspond to an entire area of the first display area 110 and the second compensation area AR2 may correspond to a portion of the first display area 110, for example. In an embodiment, like FIG. 3B, the first compensation area AR1 may correspond to a portion of the first display area 110, the second compensation area AR2 may correspond to a portion of the first display area 110 and the second compensation area AR2 may be included in the first compensation area AR1, for example.

In an embodiment, the driving controller 200 may operate the first compensation area AR1 in a first frame FR1 and the second compensation area AR2 in a second frame FR2, for example. In addition, the driving controller 200 may operate the first compensation area AR1 in a third frame FR3 and the second compensation area AR2 in a fourth frame FR4.

In an embodiment, areas illustrated in FIG. 17 may mean the second display area 120 of FIG. 16, for example.

The driving controller 200 may operate a stain compensation for a first compensation area AR1 of the second display area 120 in a predetermined frame and a stain compensation for a second compensation area AR2 of the second display area 120 in another predetermined frame to generate the data signal DATA. In an embodiment, like FIG. 3A, the first compensation area AR1 may correspond to an entire area of the second display area 120 and the second compensation area AR2 may correspond to a portion of the second display area 120, for example. In an embodiment, like FIG. 3B, the first compensation area AR1 may correspond to a portion of the second display area 120, the second compensation area AR2 may correspond to a portion of the second display area 120 and the second compensation area AR2 may be included in the first compensation area AR1, for example.

In an embodiment, the driving controller 200 may operate the first compensation area AR1 in a first frame FR1 and the second compensation area AR2 in a second frame FR2, for example. In addition, the driving controller 200 may operate the first compensation area AR1 in a third frame FR3 and the second compensation area AR2 in a fourth frame FR4.

In the illustrated embodiment, the driving controller 200 may operate a stain compensation for the first compensation area AR1 corresponding to the entire area of the first display area 110 and the second display area 120 in the first frame FR1 and a stain compensation for the second compensation area AR2 corresponding to a portion of the first display area 110 and the second display area 120 in the second frame FR2. Thus, the memory access may be reduced when compensating the stain of the image so that the power consumption of the display apparatus may be reduced.

Figure 18:
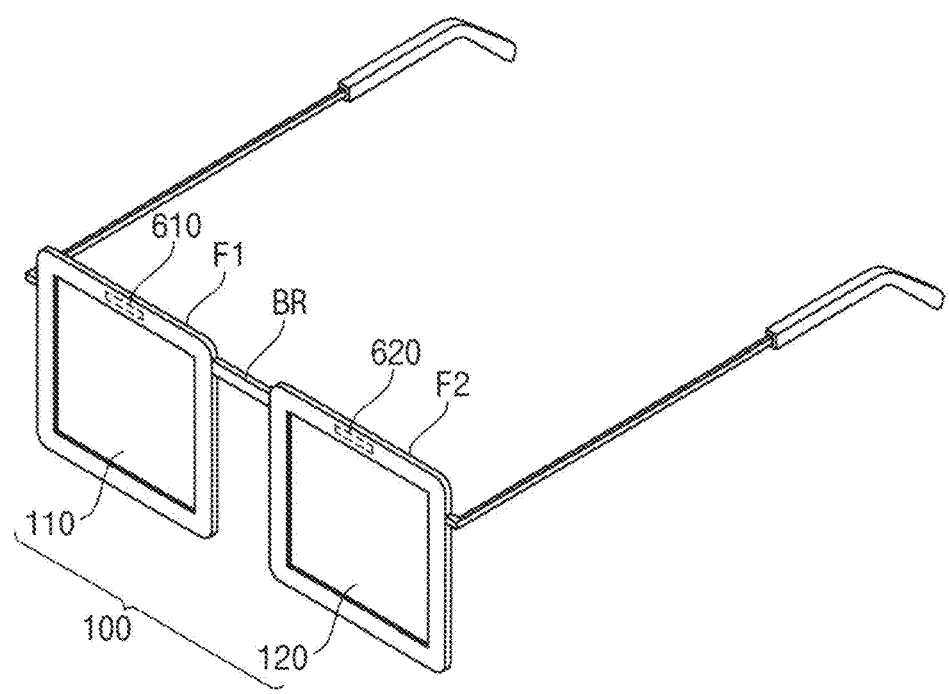
FIG. 18 is a perspective view illustrating an embodiment of an augmented reality display system according to the invention.

FIG. 18 is a perspective view illustrating an embodiment of an augmented reality display system according to the invention.

The augmented reality display system in the illustrated embodiment is substantially the same as the augmented reality display system of the previous embodiment explained referring to FIGS. 16 and 17 except that the augmented reality display system further includes an eye tracker. Thus, the same reference numerals will be used to refer to the same or like parts as those described in the previous embodiment of FIGS. 16 and 17 and any repetitive explanation concerning the above elements will be omitted.

Referring to FIGS. 17 and 18, the augmented reality display system may further include a first eye tracker 610 disposed at the right eye frame F1 and tracking a user's right eye viewpoint. Herein, the second compensation area AR2 of the first display area 110 may be displaced according to the user's right eye viewpoint.

The augmented reality display system may further include a second eye tracker 620 disposed at the left eye frame F1 and tracking a user's left eye viewpoint. Herein, the second compensation area AR2 of the second display area 120 may be displaced according to the user's left eye viewpoint.

Figure 19:
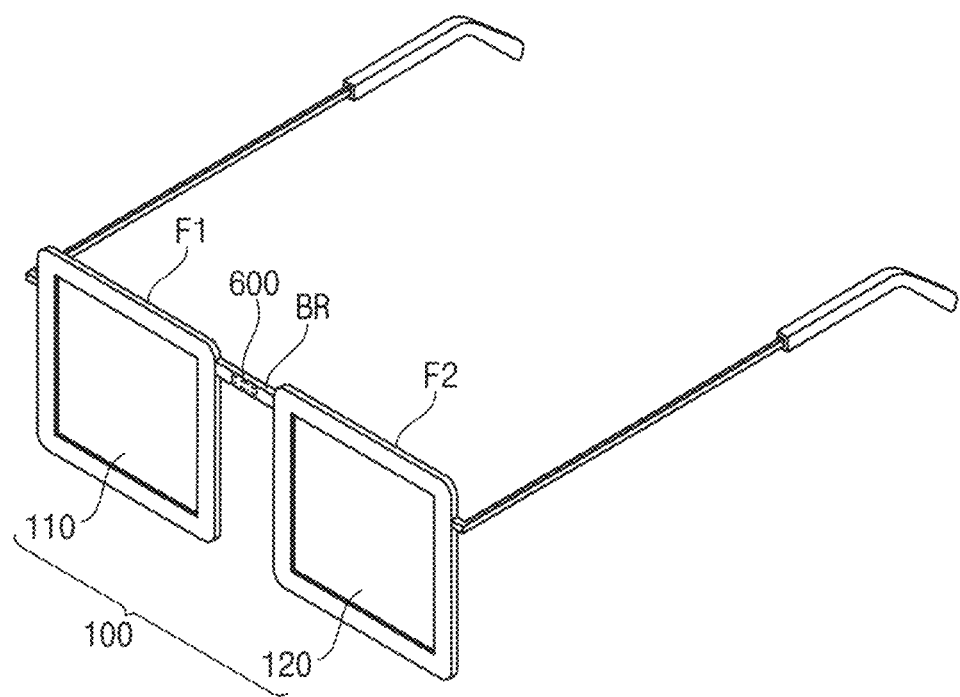
FIG. 19 is a perspective view illustrating an embodiment of an augmented reality display system according to the invention.

FIG. 19 is a perspective view illustrating an embodiment of an augmented reality display system according to the invention.

The augmented reality display system in the illustrated embodiment is substantially the same as the augmented reality display system of the previous embodiment explained referring to FIGS. 16 and 17 except that the augmented reality display system further includes an eye tracker. Thus, the same reference numerals will be used to refer to the same or like parts as those described in the previous embodiment of FIGS. 16 and 17 and any repetitive explanation concerning the above elements will be omitted.

Referring to FIGS. 17 and 19, the augmented reality display system may further include an eye tracker 600 disposed at the bridge BR connecting the right eye frame F1 and the left eye frame F2 and tracking a user's viewpoint. Herein, the second compensation area AR2 of the first display area 110 may be displaced according to the user's viewpoint.

By the embodiments of the display apparatus, the virtual reality display system, the augmented reality display system and the method of driving the display apparatus, the power consumption may be reduced.

The foregoing is illustrative of the invention and is not to be construed as limiting thereof. Although a few embodiments of the invention have been described, those skilled in the art will readily appreciate that many modifications are possible in the embodiments without materially departing from the novel teachings and advantages of the invention. Accordingly, all such modifications are intended to be included within the scope of the invention as defined in the claims. Therefore, it is to be understood that the foregoing is illustrative of the invention and is not to be construed as limited to the illustrative embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A display apparatus comprising:
    a display panel;
    a driving controller which operates a first stain compensation for a first compensation area of the display panel in a first frame, operates a second stain compensation for a second compensation area of the display panel in a second frame, and generates a data signal, a size of the second compensation area being less than a size of the first compensation area; and
    a data driver which converts the data signal into a data voltage and outputs the data voltage to the display panel,
    wherein a stain outside the second compensation area is not compensated in the second frame,
    the second compensation area is only in a central portion having a closed boundary surrounded by a peripheral portion in the display, and
    a ratio of a number of frames when compensating the first compensation area to a number of frames when compensating the second compensation area is 2:1.

2. The display apparatus of claim 1, wherein the first compensation area corresponds to an entire area of the display panel.

3. The display apparatus of claim 1, wherein the first compensation area and the second compensation area are at least partially overlapped.

4. The display apparatus of claim 1, wherein the driving controller receives threshold voltage compensation data, compensates a deviation of a threshold voltage of a driving transistor of a pixel of the display panel from a memory and compensates the first stain compensation and the second stain compensation.

5. The display apparatus of claim 1, wherein the driving controller receives deterioration compensation data, compensates a deterioration of a light-emitting element of a pixel of the display panel from a memory and compensates the first stain compensation and the second stain compensation.

6. The display apparatus of claim 1, further comprising an eye tracker which tracks a view point of a user,
    wherein the second compensation area is displaced along the view point of the user.

7. The display apparatus of claim 1, wherein a size of the second compensation area is varied according to a user setting.

8. A method of driving a display apparatus, the method comprising:
    operating a first stain compensation for a first compensation area of a display panel in a first frame;
    operating a second stain compensation for a second compensation area of the display panel in a second frame, a size of the second compensation area being less than a size of the first compensation area;
    converting a data signal generated by the stain compensation into a data voltage; and
    outputting the data voltage to the display panel,
    wherein a stain outside the second compensation area is not compensated in the second frame,
    the second compensation area is only in a central portion having a closed boundary surrounded by a peripheral portion in the display, and
    a ratio of a number of frames when compensating the first compensation area to a number of frames when compensating the second compensation area is 2:1.

9. The method of claim 8, wherein the first compensation area corresponds to an entire area of the display panel.

10. The method of claim 8, wherein the first compensation area and the second compensation area are at least partially overlapped.

11. The method of claim 8, further comprising tracking a viewpoint of a user,
    wherein the second compensation area is displaced along the viewpoint of the user.

* * * * *